(12) United States Patent
Gamain

(10) Patent No.: US 8,562,240 B2
(45) Date of Patent: Oct. 22, 2013

(54) CONNECTION DEVICE FOR ASSEMBLING TOGETHER TWO MEMBERS

(75) Inventor: Claude Gamain, Rueil Malmaison (FR)

(73) Assignee: Sodem System, Le Mesnil Simon (FR)

( * ) Notice: Subject to any disclaimer, the term of this patent is extended or adjusted under 35 U.S.C. 154(b) by 0 days.

(21) Appl. No.: 13/356,295

(22) Filed: Jan. 23, 2012

(65) Prior Publication Data

US 2012/0195680 A1 Aug. 2, 2012

(30) Foreign Application Priority Data

Jan. 27, 2011 (FR) ...................................... 11 50652

(51) Int. Cl.
*F16B 7/22* (2006.01)
(52) U.S. Cl.
USPC ........................................ 403/255; 403/322.4
(58) Field of Classification Search
USPC .................... 403/254, 255, 374.5, 322.7, 325
See application file for complete search history.

(56) References Cited

U.S. PATENT DOCUMENTS

| 4,763,459 | A | * | 8/1988 | Wesselski | 52/646 |
| 4,998,842 | A | * | 3/1991 | Sheridan | 403/252 |
| 5,048,995 | A | * | 9/1991 | Beaulieu | 403/264 |
| 5,269,619 | A | * | 12/1993 | Warkus et al. | 403/240 |
| 5,439,310 | A | * | 8/1995 | Evenson et al. | 403/321 |
| 5,647,682 | A | * | 7/1997 | Riehm | 403/297 |
| 6,478,501 | B1 | * | 11/2002 | Kahl | 403/255 |
| 2012/0195680 | A1 | * | 8/2012 | Gamain | 403/322.4 |

FOREIGN PATENT DOCUMENTS

FR 2 454 551 A1 11/1980
FR 2 721 377 A1 12/1995

* cited by examiner

*Primary Examiner* — Joshua Kennedy
(74) *Attorney, Agent, or Firm* — Sughrue Mion, PLLC

(57) ABSTRACT

A connection device for assembling a receiver first section member presenting an inner cavity and a fastener second section member presenting at least one groove having a constricted opening, the connection device to be received in the inner cavity of the receiver member and including a cage forming a pair of jaws for engaging the groove of the fastener member through its constricted opening. The device includes a spacer member for spacing the jaws apart, and an actuator mechanism for moving the spacer member relative to the jaws, the actuator mechanism including a pivotable lever that pivots about a first pivot pin. Then actuator mechanism includes a connection bar connected to the lever via a second pivot pin and to an abutment element via a third pivot pin, the three pivot pins are parallel, the distance between the first pin and the third pin being variable by actuating the lever.

16 Claims, 2 Drawing Sheets

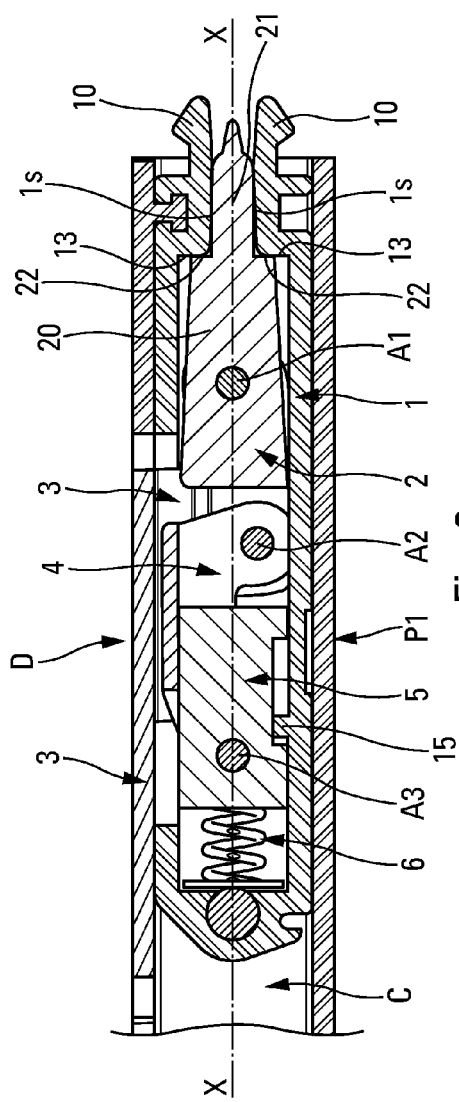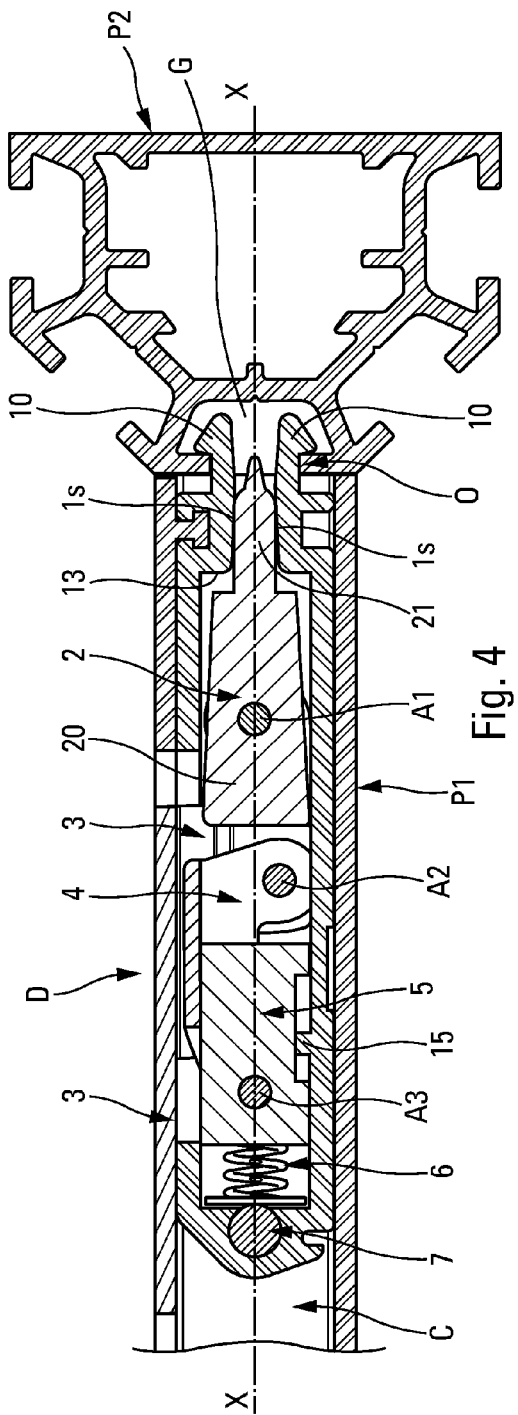

CONNECTION DEVICE FOR ASSEMBLING TOGETHER TWO MEMBERS

The present invention relates to a connection device for assembling together a receiver first section member presenting an inner cavity, and a fastener second section member presenting at least one groove having a constricted opening. The connection device is intended to be received in stationary manner in the inner cavity of the receiver member and includes a cage forming a pair of jaws for coming into engagement in the groove of the fastener member through its constricted opening. The device also includes a spacer member for spacing the jaws apart, and actuator means for moving the spacer member relative to the jaws. The actuator means include a pivotable lever that pivots about a first pivot pin. The advantageous fields of application of the present invention are the fields of exhibition equipment known as general installation equipment and secondarily exhibition and/or office furniture, fields in which it is necessary to be able to mount and remove structures and/or pieces of furniture quickly. Naturally, the present invention may also be used in any other field in which two members need to be assembled together, preferably perpendicularly.

BACKGROUND OF THE INVENTION

In the prior art, document FR-2 721 377 is already known that describes a connection device for assembling together two members. The device includes a movable hairpin-shape forming a pair of jaws. In order to space the jaws of the hairpin-shape apart, stationary spacer means are provided, and in order to move the hairpin-shape, cam means are provided including a pivotable lever that pivots about a pin and to which an eccentrically-mounted disk is associated. The device further includes a cage inside which the hairpin-shape, the spacer means, and the cam means are received. Thus, the hairpin-shape moves in the cage under the action of the eccentric disk that is actuated by the pivotable lever, and its jaws are spaced apart by the spacer means that are stationary in the cage. Consequently, the connection device requires the use of a stationary cage and of a movable hairpin-shape. In addition, other than the lever, the cam means include a movable pin that biases the hairpin-shape by means of a spring. As a result, actuation of the lever is difficult and requires significant force.

OBJECTS AND SUMMARY OF THE INVENTION

An object of the present invention is to lighten the actuation force necessary to cause the lever to pivot. Another object is to reduce the number of parts.

In order to achieve these objects, the present invention proposes that the actuator means also include a connection bar that is connected to the pivotable lever via a second pivot pin and to an abutment element via a third pivot pin, the three pivot pins being parallel, the distance between the first pin and the third pin being variable by actuating the lever. Unlike document FR-2 721 377, the actuator means move the spacer member between the jaws, while in the prior-art document the cam means move the hairpin-shape relative to the spacer means. In addition, the off-centered disk supported by the lever in document FR-2 721 377 is replaced by a connection bar having much greater mechanical advantage. The third pivot pin may be stationary, or preferably movable inside the cage.

According to an advantageous characteristic of the invention, the spacer member defines a movement axis that is perpendicular to the three pivot pins, the first and third pivot pins being situated on the movement axis, while the second pivot pin is movable relative to the movement axis as a function of the position of the lever. Preferably, the second pin is situated above the movement axis when the spacer member does not space the jaws apart, and below the movement axis when the spacer member spaces the jaws apart. Thus, when the jaws are spaced apart, the second pivot pin is urged towards a stable position away from the equilibrium corresponding to the alignment of the three pivot pins. This guarantees that the connection device is in a stable state when it is closed and in engagement with a fastener member.

In another advantageous aspect of the invention, the pivotable lever is connected to the spacer member via the first pivot pin. Thus, the lever acts directly on the spacer member and not on the cage that remains stationary.

According to an advantageous characteristic of the present invention, the abutment element is movable in the cage between two extreme positions. However, it is not impossible for the abutment element to be stationary inside the cage. Advantageously, the abutment element is urged towards the jaws by a spring that bears against the cage. Preferably, the cage includes an open housing for receiving a blocking pin making it possible to fasten the device in the cavity of the receiver member, the spring acting on the pin so as to hold it in its housing. In addition, the cage may form an abutment rib against which the abutment element comes into abutment under the action of the spring and/or of the third pin that is urged by the connection bar and by the lever. When the connection device is open, i.e. when the pivotable lever is lifted, the spring pushes the abutment element in such a manner as to come into abutment against the abutment rib. In contrast, when the pivotable lever is lowered, thereby urging the spacer member between the jaws, it may happen that the spring is compressed fully so that the abutment element comes into abutment against the abutment rib. However, this situation is not desirable given that it is always preferable for the spring to fulfill its function of resilient bias.

In another advantageous aspect of the invention, the spacer member comes into engagement with converging surfaces of the jaws so as to space them apart progressively until they come into clamping engagement with the constricted opening of the groove of the fastener member. In this way, and as a function of the size of the constricted opening of the groove, the spacer member is engaged to a greater or lesser extent between the jaws so as to space them apart. Naturally, in the absence of fastener members, the spacer member is engaged fully between the two jaws so as to space them fully apart. Preferably, the spacer member is urged resiliently between the jaws by the spring having a force that is transmitted by means of the abutment element, the connection bar, and the lever. The transmission of the force of the spring is optimized as a result of the three pivot pins being substantially in alignment.

In another advantageous aspect of the invention, the cage is made as a single piece by extruding metal, advantageously with an initial spacing between the jaws that is greater than the maximum spacing in the cavity of the receiver member. The initial spacing of the jaws makes it possible to use an extrusion core or pin that is sufficiently robust: the inside of the cage is made with an extrusion core or pin that is connected to the extrusion plate merely via a bridge forming the separation between the two jaws. By initially spacing the jaws apart, the size of the bridge is increased and thus the robustness of the extrusion core or pin. Then, it is easy to compress the cage in such a manner as to move the jaws a little closer, so as to be able to insert it in the cavity of a receiver member.

The spirit of the invention resides in the use of a connection bar associated with a pivotable lever so as to move a spacer member between the jaws of a cage. This arrangement requires the use of three pivot pins making it possible to vary the distance between two pins. An advantageous aspect of the present invention resides in the fact that the cage forming the jaws is stationary, such that it is not necessary to provide a movable hairpin-shape inside a cage as in document FR-2 721 377. In contrast, the spacer member is movable inside the cage, and preferably the three pivot pins are movable inside the cage.

BRIEF DESCRIPTION OF THE DRAWINGS

The invention is described more fully below with reference to the accompanying drawings which show an embodiment of the present invention by way of non-limiting example.

In the figures:

FIG. 3 is a view similar to the view in FIG. 2 with the pivotable lever lowered down; and FIG. 4 is a view similar to the view in FIGS. 2 and 3 with the pivotable lever lowered down and with the jaws in engagement with a fastener member.

MORE DETAILED DESCRIPTION

Figure 1:
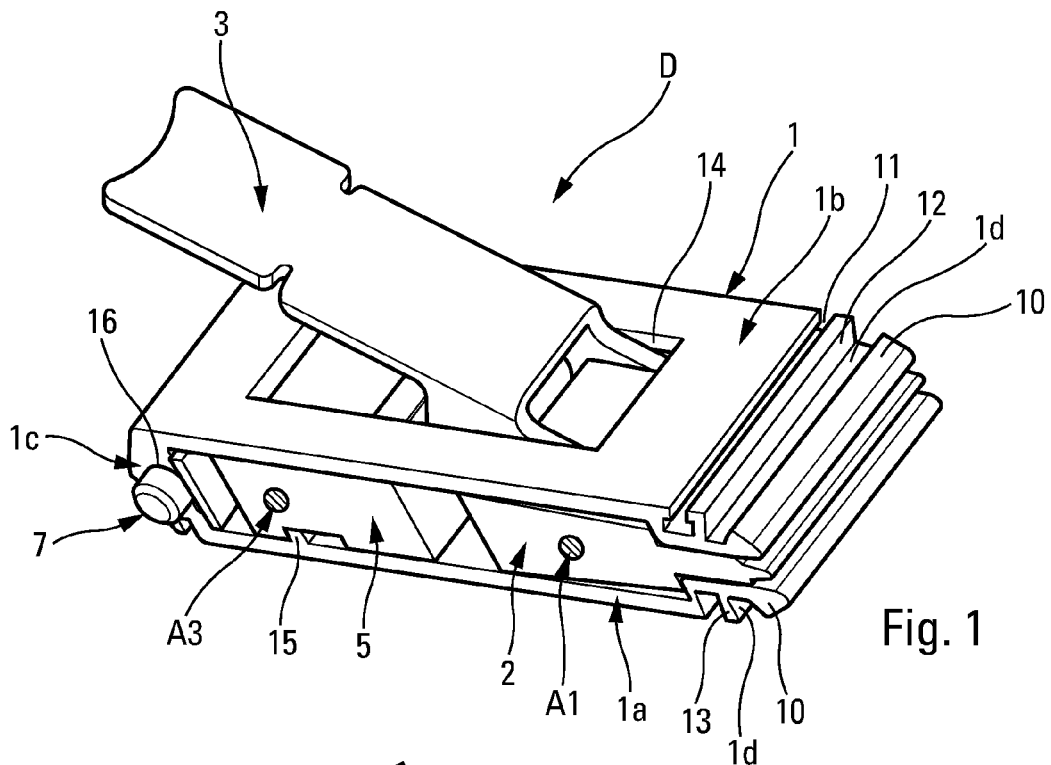
FIG. 1 is a perspective view of a connection device of the invention with the pivotable lever lifted half way up.
Figure 2:
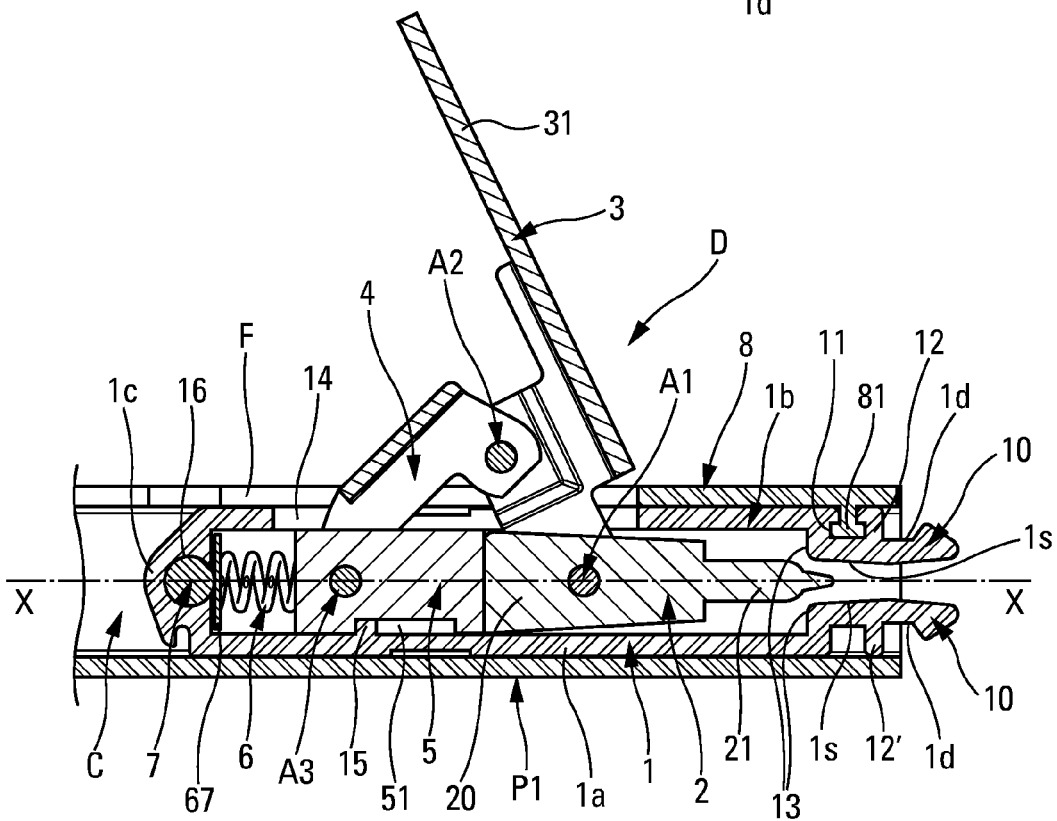
FIG. 2 is a longitudinal cross-section view through the FIG. 1 connection device engaged in the cavity of a receiver member, with the pivotable lever lifted fully up.

Reference is made to all of FIGS. 1 to 4 in order to describe in detail the structure and the operation of a connection device made in accordance with a non-limiting embodiment of the invention. The connection device, designated overall by the reference D, is for mounting in stationary manner in a cavity C of a receiver section member P1, as can be seen in FIGS. 2 to 4. Jaws 10 of the connection device D project out from the cavity C so as to be able to come into engagement with a fastener section member P2 that forms a groove G having a constricted opening O. It can be seen in FIG. 4 that the two jaws 10 are arranged inside the groove G, in engagement with the constricted opening O. In this way, the fastener member P2 is assembled securely to the receiver member P1. The triangular configuration of the external ends of the jaws 10 even contributes to exerting traction on the member P2 so as to press it flat against the member P1. In this way, it is possible to eliminate any clearance between the two members P1 and P2. When assembled together in this way, the member P2 extends perpendicularly to the member P1. It can also be said that the end of the member P1 is connected to the length of the member P2. The members P1 and P2 may be made using any technique and any material, but preferably they are made by extruding aluminum.

The connection device D of the invention comprises a plurality of component elements, namely: a cage 1; a spacer member 2; a pivotable lever 3; a connection bar 4; an abutment element 5; one or more springs 6; and a blocking pin 7. Optionally, the connection device may include a small plate 67 between the spring 6 and the pin 7, and a piece of trim 8 that forms an accessory to the cage 1.

Advantageously, the cage 1 is made by extruding aluminum. Consequently, the cage 1 presents a uniform section and its width may be about 27 mm, for example. The cage 1 is in the form of a hairpin-shape comprising two substantially-parallel branches 1a and 1b that are interconnected at one of their ends via a junction section 1c. The section 1c advantageously forms an open housing 16 for receiving the blocking pin 7. The pin projects axially out from the housing 16 on either side of the cage, as can be seen in FIG. 1. Thus, the ends of the pin 7 serve as blocking studs inside the cavity C of the receiver member. To this end, the receiver member forms two through holes for the blocking pin 7 that is engaged in the cage 1 once the cage has been inserted into the cavity C of the receiver member P1. The blocking pin 7 alone may fasten the connection device D inside the cavity C of the receiver member P1. The way in which the blocking pin 7 is held inside its open housing 16 is described below. It can already be observed that the housing 16 is open towards the inside of the cage, such that the pin 7 is not completely surrounded by the metal that constitutes the cage. At the end remote from the junction section 1c, the two branches 1a and 1b form the jaws 10 of the connection device. Each of the jaws 10 forms a reception groove 1d in which there is received a corresponding edge of the constricted opening O, as shown in FIG. 4. The groove 1d is formed between a thick triangular portion of the jaw 10 and a flange 12, 12'. The flange 12 formed at the branch 1b also defines a rail 11 for receiving the trim 8 that is formed with a heel 81 that is intended to be engaged by sliding into the rail 11. The bar 8 merely has an appearance function making it possible to mask, in part, the slot F formed in the receiver member P1 and through which the pivotable lever 3 can pass, as described below. The trim 8 is optional. It is entirely possible to make the two jaws 10 completely symmetrical. Thus, the rail 11 is optional. It should also be observed that the two jaws 10 extend towards each other at the ends of the branches 1a and 1b, forming an internal shoulder 13 that decreases the distance between the two jaws 10. Advantageously, the jaws 10 form two converging surfaces 1s that converge towards each other in such a manner as to decrease even further the distance separating them. The two converging surfaces 1s converge towards each other from the shoulders 13 to the free ends of the jaws 10. The function of the converging surfaces 1s is described below. The branch 1a of the cage 1 also forms an abutment rib 15 that is oriented towards the inside of the cage, as can be seen in the figures. In addition, the branch 1b forms a large opening 14 through which the pivotable lever 3 can pass, as can be seen very clearly in FIG. 1.

In order to space apart the jaws 10 of the cage 1, the spacer member 2 is movable in the cage 1 along a movement axis X. The spacer member 2 comprises a block 20 and a spacer blade 21 that are connected together, forming two abutment zones 22. The block 20 is pierced with a borehole that is situated on the axis X and that receives a pivot pin A1. The pin A1 extends perpendicularly to the plane of the sheet of the figure. The spacer blade 21 is for inserting between the two converging surfaces 1s of the jaws 10. The blade 21 preferably presents a free end that is pointed or rounded so as to make it easier to move between the two converging surfaces 1s. In the various figures, it can be seen that the spacer blade 21 can move in the cage 1 between the jaws 10 between two extreme positions corresponding to FIG. 2 and to FIG. 3. In FIG. 2, the spacer blade 21 is not even in engagement with the converging surfaces 1s. Its end is barely engaged between the two surfaces. In contrast, in FIG. 3, the spacer blade 21 is engaged fully between the jaws 10 and spaces them apart fully. In FIG. 3, it should be observed that the two abutment zones 22 are directly in abutment against the shoulders 13 of the cage.

The pivotable lever 3 is connected to the spacer member 2 via the pivot pin A1, as visible in FIG. 2. In this way, the spacer member 2 and the pivotable lever 3 are secured to each other, while being able to pivot relative to each other about the pivot pin A1. In addition, the pivotable lever 3 is secured to the connection bar 4 via a second pivot pin A2. It should be observed that the pivot pin A1 is situated on the movement axis X of the spacer member 2, while the pivot pin A2 is movable relative to the axis X. Naturally, the pivot pins A1 and A2 are spaced apart by a certain distance that is constant, since it is defined by the lever 3. The lever also includes a lever arm 31 via which the lever 3 may be gripped so as to pivot it about the pin A1 so as to move the pin A2 relative to the movement axis X of the spacer member 2.

In addition to being connected to the lever 3 via the pin A2, the connection bar 4 is connected to the abutment element 5 via a third pivot pin A3 that is also situated on the movement axis X. Thus, by moving the second pin A2, the distance between the pins A1 and A3 along the axis X is varied. The pins A1 and A3 always remain on the movement axis X, while the pin A2 is movable relative to the axis X, as can be seen by comparing FIGS. 2, 3, and 4. It should even be observed that the pin A2 is situated well above the axis X in FIG. 2, while the same pin A2 is situated below the axis X in FIGS. 3 and 4. In FIG. 2, the spacing between the pins A1 and A3 is at a minimum, given that the actuator member 2 is in abutment against the abutment element 5, while in FIGS. 3 and 4, the spacing between the pins A1 and A3 is at a maximum, with the pin A2 situated just below the movement axis X.

The abutment element 5 may be made in the form of a piece that is stationary inside the cage 1, or it may even be made integrally with the cage 1. However, preferably, the abutment element 5 is a piece that is movable inside the cage 1. As a result, not only are the pins A1 and A2 movable relative to the cage, but so is the pin A3. It should be observed that the abutment element 5 forms a recess 51 in its bottom face facing the branch 1a of the cage 1. Thus, the abutment rib 15 is housed in the recess 51 and can move between two extreme outer positions corresponding to the rib 15 coming into abutment with the two longitudinal edges of the recess 51. In FIG. 2, the abutment rib 15 is in contact with one edge of the recess 51. The abutment element 5 can thus move in limited manner inside the cage 1. However, it is more advantageous to urge the abutment element 5 towards the jaws 10 by means of one (or more) spring(s) 6. By way of example, the spring 6 may bear directly against the blocking pin 7 so as to hold it in its housing 16. In a variant, a small plate 67 may be interposed between the spring 6 and the pin 7 so as to avoid the spring 6 moving transversely while the pin 7 is being removed from or engaged in its housing 16. The force exerted by the spring 6 makes it possible to press the plate 67 effectively against the pin 7 so as to hold it in its housing 16. In addition, the spring 6 makes it possible to urge the abutment element 5 against the abutment rib 15, as shown in FIG. 2, when the spacer member 2 is not in engagement between the jaws 10. In this position, the bias exerted by the spring 6 is applied only against the abutment element 5, without being transmitted to the connection bar 4, to the lever 3, and/or to the spacer member 2. From the position shown in FIG. 2, the pivotable lever 3 may be actuated, thereby causing the connection bar 4 and the spacer member 2 to move, without moving the abutment element 5. In contrast, when the spacer blade 21 is engaged between the jaws 10, the friction between the converging surfaces 1s and the blade 21 generates a reaction force that opposes the force of the spring 6. When the jaws 10 are not engaged in a groove G of a fastener member P2, as shown in FIG. 3, the blade 21 may be engaged fully between the jaws 10 until the block 20 comes into abutment against the shoulders 13. From that moment on, the abutment element 5 moves out of abutment contact with the abutment rib 15, compressing the spring 6. When the arm 31 of the lever 3 is folded down fully in the window F of the member P1, the pivot pin A2 that connects the lever 3 to the connection bar 4 is situated below the axis X, and this corresponds to an extremely stable position given that the spring 6 tends to push the pin A2 even further away from the movement axis X. The distance between the pins A1 and A3 is close to the maximum, corresponding to all three pins A1, A2, and A3 being in alignment.

In contrast, with reference to FIG. 4, it can be seen that the spacer blade 21 is not engaged fully between the converging surfaces 1s, as in FIG. 3. The blade 21 cannot be engaged further, given that the jaws 10 are in engagement with the constricted opening O of the groove G. In this position, the abutment element 5 is constrained to move towards the pin 7, compressing the spring 6. The reaction force caused by the friction between the blade 21 and the jaws 10 is transmitted to the abutment element 5 by means of the lever 3 and the connection bar 4. The pivot pin A2 is in the same position as in FIG. 3, i.e. situated a little below the movement axis X of the spacer member 2. The spacing between the pins A1 and A3 is the same as in FIG. 3. However, the assembly constituted by the spacer member 2, the lever 3, the connection bar 4, and the abutment element 5 is in a position that is different from the position in FIG. 3, given that the spacer blade 21 is not engaged as fully between the jaws 10. The spring 6 in FIG. 4 is compressed more than in FIG. 3. FIG. 4 corresponds to a given configuration for one size of constricted opening O. With a smaller opening O, the spacer blade 21 would be engaged less fully between the converging surfaces 1s of the jaws 10, and as a result the assembly constituted by the spacer member 2, the lever 3, the connection bar 4, and the abutment element 5 would be moved towards the pin 7, compressing the spring 6 even more. An extreme position could be achieved in which the abutment rib 15 comes into abutment against the opposite edge of the recess 51. However, such a configuration is not desirable.

The present invention is described with reference to a non-limiting embodiment that uses a pivotable lever associated with a connection bar so as to move an actuating spacer member 2. However, the present invention may also apply to a connection device of another type in which the lever and the associated connection bar 4 are used to move the cage or a hairpin-shape forming the jaws for coming into engagement with the fastener member P2. Thus, the present invention applies to any connection device that uses a pivotable lever associated with a connection bar giving mechanical advantage. The main function of the connection bar is to make the lever easier to actuate by reducing the force that needs to be developed by pivoting the lever. The shapes of the jaws and of the spacer element are not critical to the present invention. The spacer member may move relative to stationary jaws or vice versa. In addition, the abutment element may be movable or stationary. It may optionally be biased by a spring. However, when it is movable, it is useful for the abutment element to come into abutment against an abutment rib when the pivotable lever is lifted. This makes it possible to remove the spacer member from between the jaws 10. The spring is advantageous since it makes it possible to compensate for manufacturing tolerances and to create resilient bias.

By means of the invention, it is possible to make connection devices for connecting section members, said devices being actuated without requiring any tool, and requiring only limited force because of the presence of the connection bar that provides the pivotable lever with mechanical advantage.

What is claimed is:

1. A connection device for assembling together a receiver first section member presenting an inner cavity, and a fastener second section member presenting at least one groove having a constricted opening, the connection device comprising a cage forming a pair of jaws, a spacer member for spacing the jaws apart, and actuator means for moving the spacer member relative to the jaws, the actuator means including a pivotable lever that is connected to the spacer member via a first pivot pin, said lever including a lever arm configured to be manually gripped and rotated so as to pivot about the first pivot pin, wherein the actuator means also include a connection bar that is connected to the lever via a second pivot pin and to an abutment element via a third pivot pin, the three pivot pins being parallel, the distance between the first pivot pin and the third pivot pin being variable by actuating the lever.

2. A connection device according to claim 1, wherein the spacer member defines a movement axis that is perpendicular to the three pivot pins, the first and third pivot pins being situated on the movement axis, while the second pivot pin is movable relative to the movement axis as a function of the position of the lever.

3. A connection device according to claim 2, wherein the second pin is situated above the movement axis when the spacer member does not space the jaws apart, and below the movement axis when the spacer member spaces the jaws apart.

4. A connection device according to claim 1, wherein the pivotable lever is connected to the spacer member via the first pivot pin.

5. A connection device according to claim 1, wherein the abutment element is movable in the cage between two extreme positions.

6. A connection device according to claim 1, wherein the abutment element is urged towards the jaws by a spring that bears against the cage.

7. A connection device according to claim 6, wherein the cage includes an open housing for receiving a blocking pin making it possible to fasten the device when inserted in the cavity of the receiver member, the spring acting on the pin so as to hold it in its housing.

8. A connection device according to claim 6, wherein the cage forms an abutment rib against which the abutment element comes into abutment under the action of the spring and/or of the third pin that is urged by the connection bar and by the lever.

9. A connection device according to claim 6, wherein the spacer member comes into engagement with converging surfaces of the jaws so as to space the jaws apart progressively, and wherein the spacer member is urged resiliently between the jaws by the spring having a force that is transmitted by the abutment element, the connection bar, and the lever.

10. A connection device according to claim 1, wherein the spacer member comes into engagement with converging surfaces of the jaws so as to space the jaws apart progressively.

11. A connection device according to claim 1, wherein the cage is made as a single piece by extruding metal.

12. An assembly, comprising,
the connection device according to claim 1,
the receiver first section member presenting the inner cavity;
the fastener second section member presenting the at least one groove having the constricted opening;
wherein the connection device is disposed a in stationary manner in the inner cavity of the receiver first section member, and the-pair of jaws are engaged in the groove of the fastener second section member through the constricted opening.

13. The assembly according to claim 12, wherein the cage is made as a single piece by extruding metal and the jaws have an initial spacing before engagement with receiver member that is greater than a maximum spacing of the inner cavity of the receiver member.

14. A connection device for assembling together a receiver first section member having an inner cavity, and a fastener second section member having a groove having a constricted opening, the connection device comprising:
a cage terminating in a pair of jaws;
a movable spacer member configured to be inserted between the jaws so as to space the jaws apart; and
an actuator mechanism that moves the spacer member, the actuator mechanism comprising a pivotable lever that is connected to the spacer member via a first pivot pin, said lever including a lever arm configured to be manually gripped and rotated so as to pivot about the first pivot pin, a connection bar connected to the lever via a second pivot pin and to an abutment element via a third pivot pin, the first, second and third pivot pins parallel to one another, the distance between the first pivot pin and the third pivot pin being variable by the lever, and the lever, when rotated to one extreme position, extends outwards away from the cage.

15. An assembly, comprising,
the connection device according to claim 14,
the receiver first section member having the inner cavity;
the fastener second section member having the groove with the constricted opening;
wherein the connection device is disposed in the inner cavity of the receiver first section member;
wherein the-pair of jaws are engaged in the groove of fastener second section member through the constricted opening; and
wherein the lever, when rotated to the one extreme position, extends outwards, away from the inner cavity of receiver first section member so as to be manually accessible.

16. The assembly according to claim 15, wherein the lever, when rotated to another position lies flush with a wall of a housing of the receiver first section member.

* * * * *